United States Patent [19]

Lin

[11] Patent Number: 5,790,098

[45] Date of Patent: Aug. 4, 1998

[54] COMPUTER MOUSE STRUCTURE

[75] Inventor: Chia Hui Lin, Hsin Tien, Taiwan

[73] Assignee: Sysgration Ltd., Taipei Hsien, Taiwan

[21] Appl. No.: 499,920

[22] Filed: Jul. 10, 1995

[51] Int. Cl.⁶ .................................................. G06F 3/033
[52] U.S. Cl. ........................................................ 345/163
[58] Field of Search ................................... 345/163–165, 345/167; 364/709.11; 463/37

[56] References Cited

U.S. PATENT DOCUMENTS

| | | | |
|---|---|---|---|
| 4,464,652 | 8/1984 | Lapson et al. | 345/165 |
| 4,652,871 | 3/1987 | Tsukada et al. | 345/164 |
| 5,311,209 | 5/1994 | Lin | 345/165 |

*Primary Examiner*—Jeffery Brier
*Attorney, Agent, or Firm*—Bacon & Thomas

[57] ABSTRACT

A computer mouse includes an upper cover and a chassis. The upper cover and the key assembly are made with one-piece construction. The upper cover and the chassis are separately provided with a buckle and fastener mechanism for connecting those two elements together. By this arrangement, the upper cover can be readily attached to the chassis without applying screws or similar fasteners. A Y-shape slot is provided at the encoding wheel supporter for easy mounting of the encoding wheel and adding lubricant. The skidding pads are provided with ratchet hookers to readily attach to the mounting holes of the chassis. The roller is mounted on a U-shaped elastic sheet for providing a biasing force to the tracing ball. The roller mechanism can be readily mounted on the roller bracket of the chassis.

7 Claims, 13 Drawing Sheets

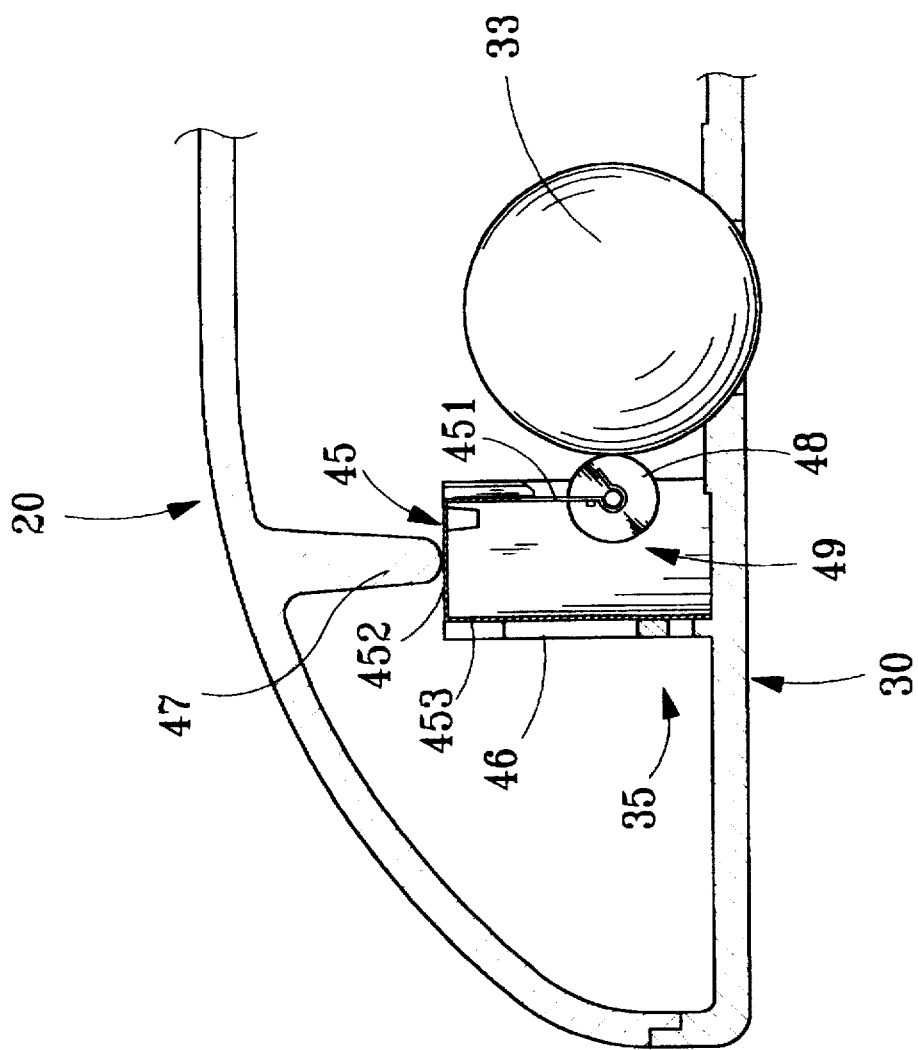

COMPUTER MOUSE STRUCTURE

BACKGROUND OF THE INVENTION

1. Field of the Invention

This invention relates to a mouse for computer, more particularly, to an improvement on the overall structures of a computer mouse which generally includes a chassis, an encoder, an encoding wheel, a roller, a skidding pad, and a cover enclosing the chassis. The mouse features easy assembling and disassembling. The repair and maintenance can be readily performed.

2. Description of the Prior Art

As shown in FIG. 1, the conventional mouse 10 generally includes an upper cover 11, a key assembly 12, a chassis 13, encoding wheel supporter 14, encoding wheel 15, roller mechanism 17, tracing ball 17, ball cover 18 and skidding pads 19. Although it meets the customer's requirements, it still has the following disadvantages during manufacturing.

1. The upper cover 11 is configured with a cover body 111 and the keys assembly 12. An actuating post 121 is disposed beneath said key assembly 12 to actuate the lever 123 of a micro switch 122. Since the lever 123 of said micro switch 122 is comparative small and the key 12 is a moveable clipping type, the alignment between said actuating post 121 and said lever 123 become very difficult. In case of any offset therebetween, controlling will become inaccurate.

2. The upper cover 11 is attached to the chassis 13 by means of screws 131. Accordingly, the assembling and disassembling of said upper cover 11 from said chassis 13 requires a screw driver. This will bring difficulty and inconvenience during maintenance and repair.

3. The encoding wheel 15 is rotatably mounted within the mounting hole 142 of said encoding wheel supporter 14. According to the present design, the mounting hole 142 of said supporter 14 has an oblique slot 141 for receiving said encoding wheel 15. Even though the oblique slot 141 is provided, the mounting of said encoding wheel 15 is still very difficult. In order to facilitate the mounting of said encoding wheel 15, additional lubricant is added into said mounting hole 142 of said supporter 14. Even by this arrangement, the rotating capability of said encoding wheel is still not within requirements. Besides, a lot of lubricant is wasted.

4. The skidding pads 19 are attached to preset positions at the underneath of said chassis 13 by adhesive. If the alignment is offset, an imbalance situation will occur. Furthermore, the skidding pads 19 tend to depart therefrom after a period of usage.

5. As clearly shown in FIG. 1A, the roller mechanism 17 generally includes a roller 161, a roller supporter 162, a spring 163 and a housing 164. Said housing 164 is firmly mounted onto said chassis 13. Said roller supporter 162 only provides a support of said roller 161 and it inherits no elastic force. Accordingly, said spring 163 shall be disposed into anchoring hole 165 on said roller supporter 162. By this arrangement, a biasing force will be provided to said tracing ball by said spring 163. But said spring 163 is comparatively small and it causes the assembling of said spring 163 to become more difficult. The eye sight of the operator will be impaired as well.

SUMMARY OF THE INVENTION

It is the object of this invention to provide a computer mouse wherein the key assembly 12 is integrally moulded with said upper cover 11. An actuating post is provided beneath said key assembly. Said actuating post is then guided by a dowel or guiding hole disposed at the front portion of said chassis. Accordingly, the alignment between said actuating post 121 and said micro switch 123 above can be ensured. The problem identified in 1 can be completely solved.

It is still the object of this invention to provide a computer mouse wherein said upper cover and said chassis are assembled by means of an interference fit and without applying any screws. The problem specified in 2 above can be completely solved.

It is still the object of this invention to provide a computer mouse wherein the encoding wheel supporter 14 is provided with a Y-shape slot for readily mounting of said encoding wheel 15 and adding of lubricant. By this arrangement, the problem specified in 3 is completely solved.

It is still the object of this invention to provide a computer mouse wherein the skidding pad 19 is anchored onto the chassis 13 by means of a hooker. By this arrangement, the skidding pad can be accurately attached to said chassis without departing therefrom. The problem specified in 4 above can be completely solved.

It is still the object of this invention to provide a computer mouse wherein said roller supporter 162 is configured with an U-shape elastic shape plate and is mounted onto said housing 164. Accordingly, there is no need to handle the spring 163 manually. The problem specified in 5 above can be completely solved.

BRIEF DESCRIPTION OF THE DRAWINGS

The drawings disclose an illustrative embodiment of the present invention which serves to exemplify the various advantages and objects hereof, and are as follows:

FIG. 9A is an exploded perspective view of the roller supporter and housing shown in FIG. 9;

FIG. 10A is a cross sectional view of the chassis taken from along line 10A—10A line in FIG. 10;

FIG. 10B is a perspective view of a skidding pad mounted on the chassis shown in FIG. 10;

FIG. 12A is a perspective view of a computer mouse made according to this invention wherein the upper cover is disassembled from the chassis.

DETAILED DESCRIPTION OF THE PREFERRED EMBODIMENT

Figure 1:
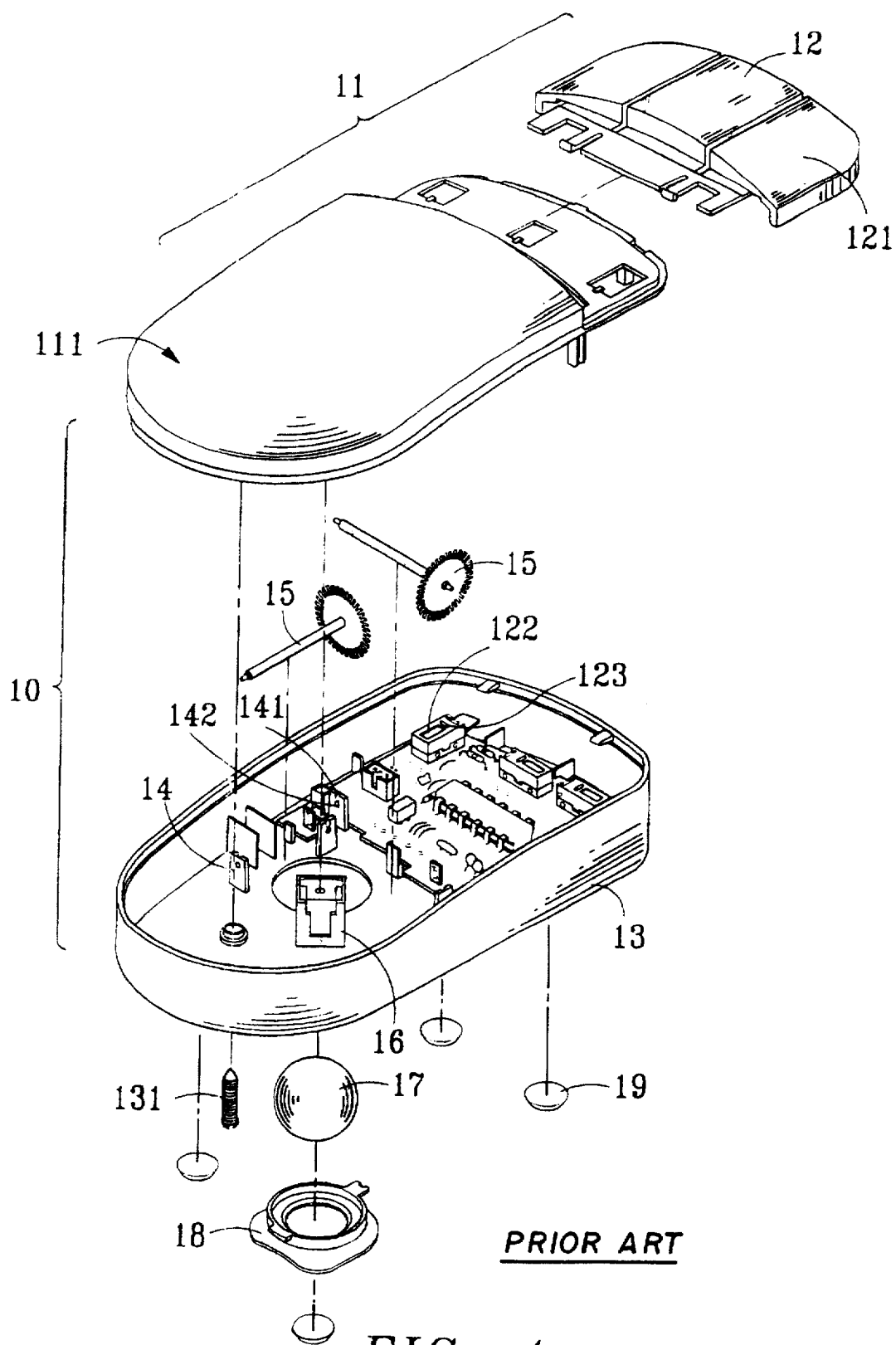
FIG. 1 is an exploded perspective view of a conventional computer mouse.
Figure 1A:
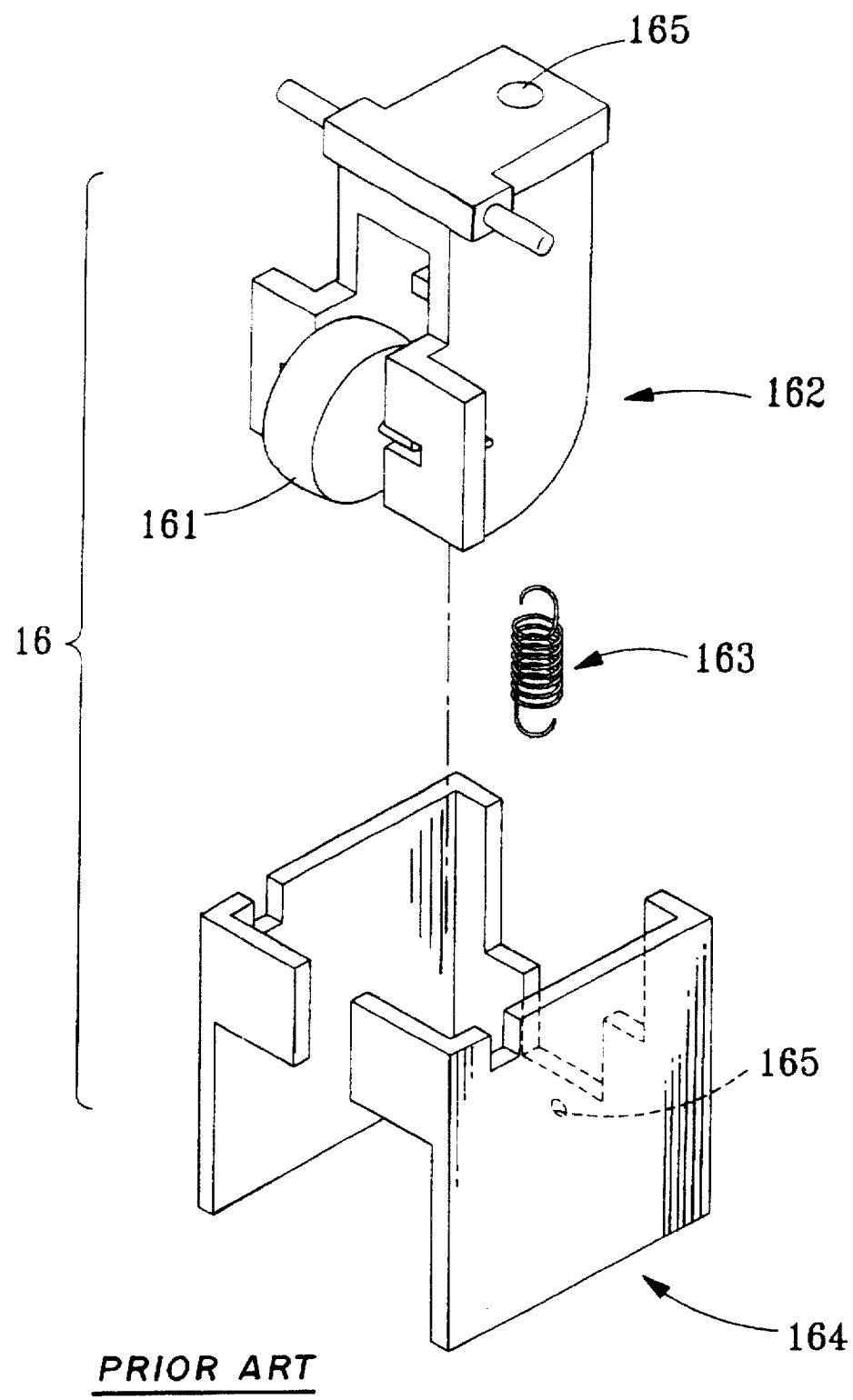
FIG. 1A is an exploded perspective view of a conventional roller supporter.
Figure 2:
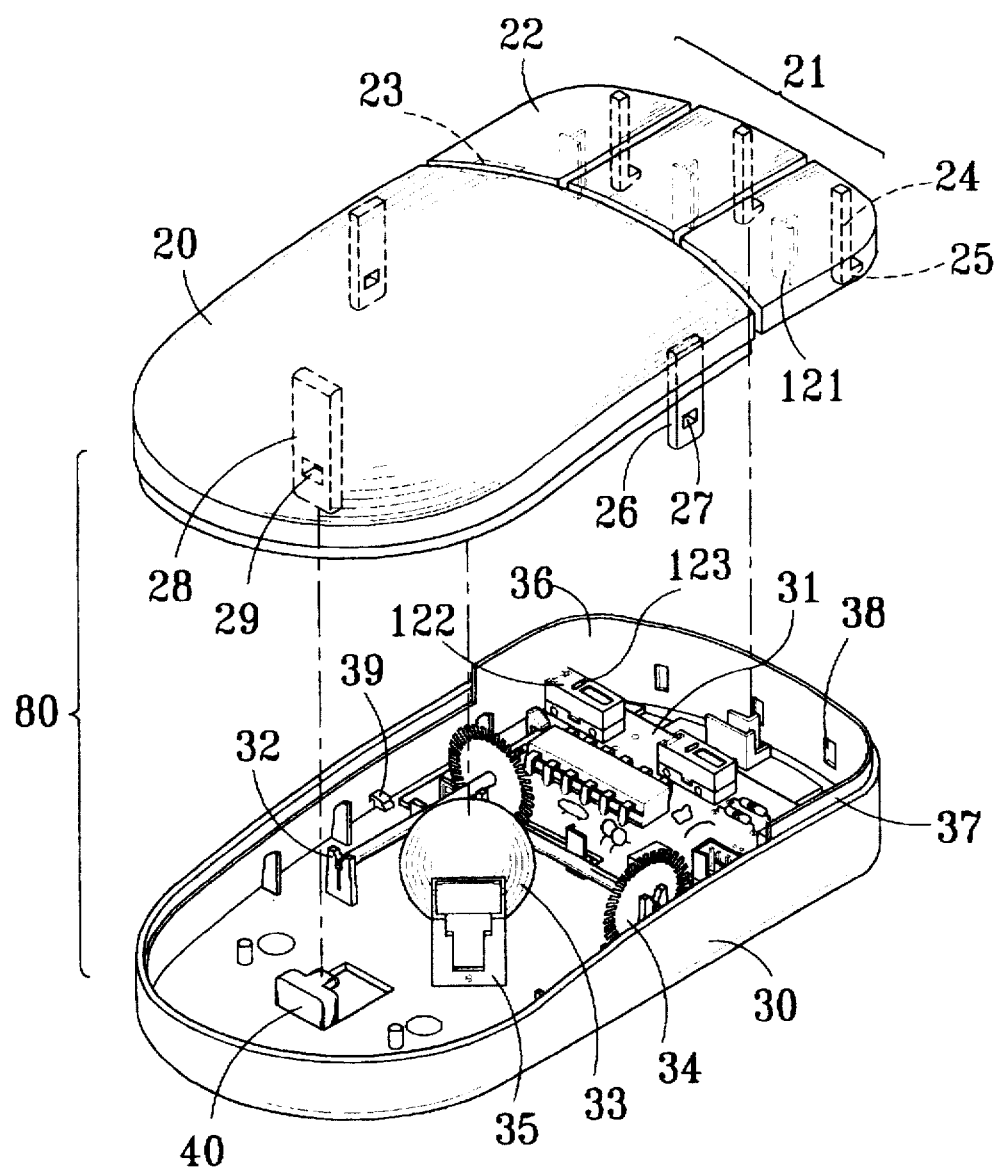
FIG. 2 is an exploded perspective view of a computer mouse made according to this invention wherein the upper cover is disassembled from the chassis.
Figure 3:
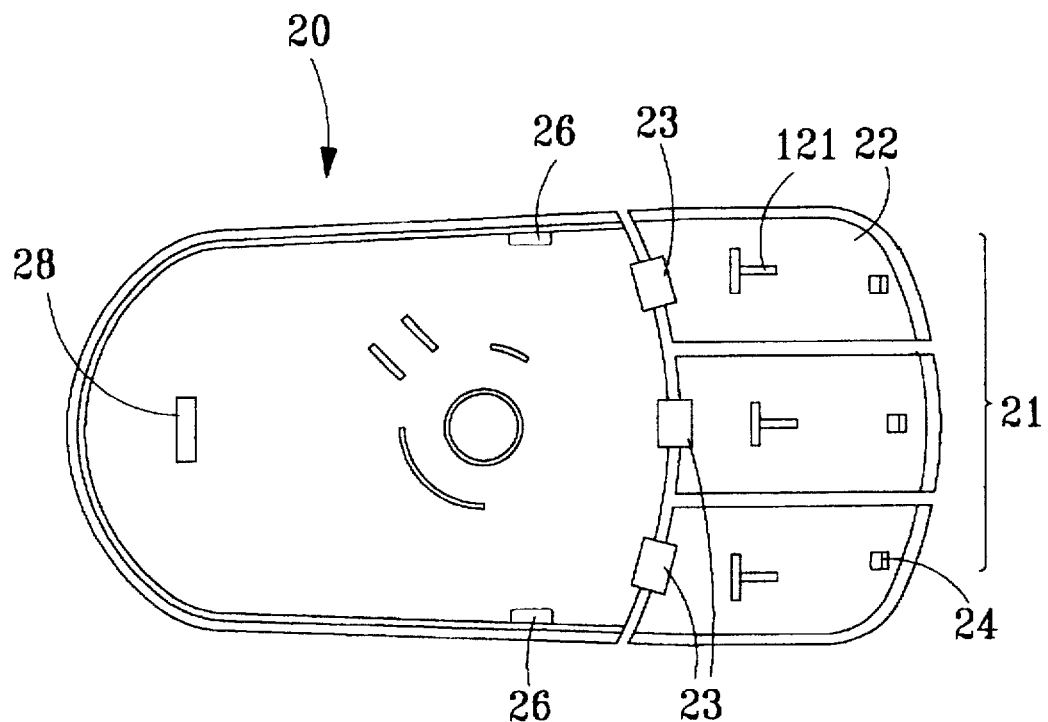
FIG. 3 is a top view of a computer mouse shown in FIG. 2.
Figure 4:
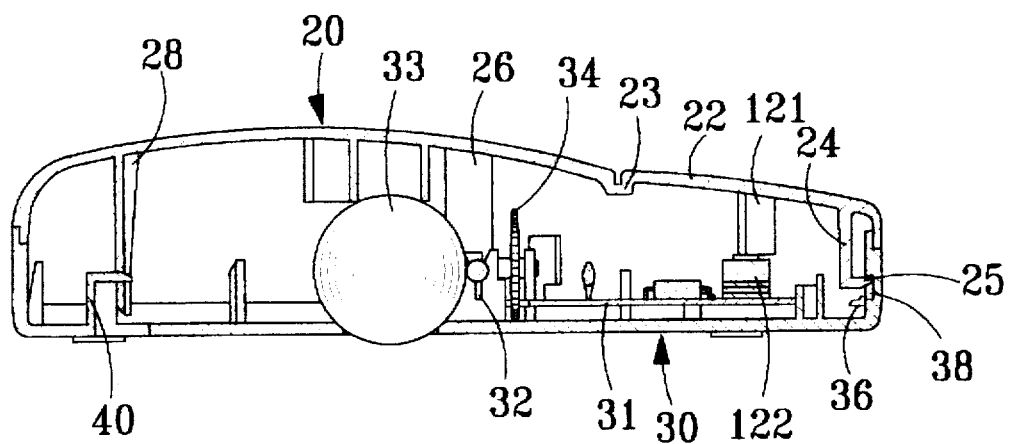
FIG. 4 is a cross sectional view of the computer mouse shown in FIG. 2.

Referring to FIGS. 2, 3 and 4, the computer mouse 80 made according to this invention includes an upper cover 20 and a chassis 30.

The front portion of said upper cover 20 is defined with a key assembly 21 including two (2) or three (3) keys 22. Each of said keys 22 is interconnected with said upper cover 20 by a tab 23. Said key assembly 21 and said upper cover 20 are made integrally into a one-piece structure. Each of said key 22 is provided with an actuating post 121 and a retaining post 24. Said actuating post 121 is used to trigger the lever 123 of a micro switch 122. A projection 25 is extended from the lower end of said retaining post 24 for limiting the stroke of said key 22. Said upper cover 20 is further provided with a plurality of fastening posts 26, each having a retaining hole 27 at its lower end. Said upper cover 20 is further provided with a fastener mechanism 28 having a retaining hole 29 at its lower end. Said fastener mechanism 28 is made from elastic metal sheet.

Said chassis 30 has an irregular peripheral wall defining a mounting space for receiving a printed circuit board 31, encoding wheel supporter 32, tracing ball 33, encoding wheel 34 and roller mechanism 35 which are jointly assembled to make a computer mouse. As a matter of fact, those elements are mounted at a similar position within said chassis 30 as a conventional mouse. The inner front peripheral wall 36 of said chassis 30 is provided with a flange 37. Said inner wall 36 is further provided with two (2) or three (3) retaining holes 38 that are slidably engaged with the projections 25 of said retaining posts 24 when the upper cover 20 is attached to said chassis 30. By this arrangement, the stroke of said keys 22 is limited by the vertical length of said retaining holes 38. In light of this, the lever 123 of said micro switch 122 can be accurately triggered by said actuating post 121. Besides, the middle portion of said chassis 30 is provided with a dowel 39 for engagement with said retaining holes 27 of said fastening post 26 when said upper cover 20 is attached to said chassis 30. The chassis 30 is also provided with a buckle mechanism 40 for engaging with the retaining hole 29 of said upper cover 20. By this arrangement, said upper cover 20 and said chassis 30 can be readily assembled without applying screws or equivalent fasteners.

Figure 5:
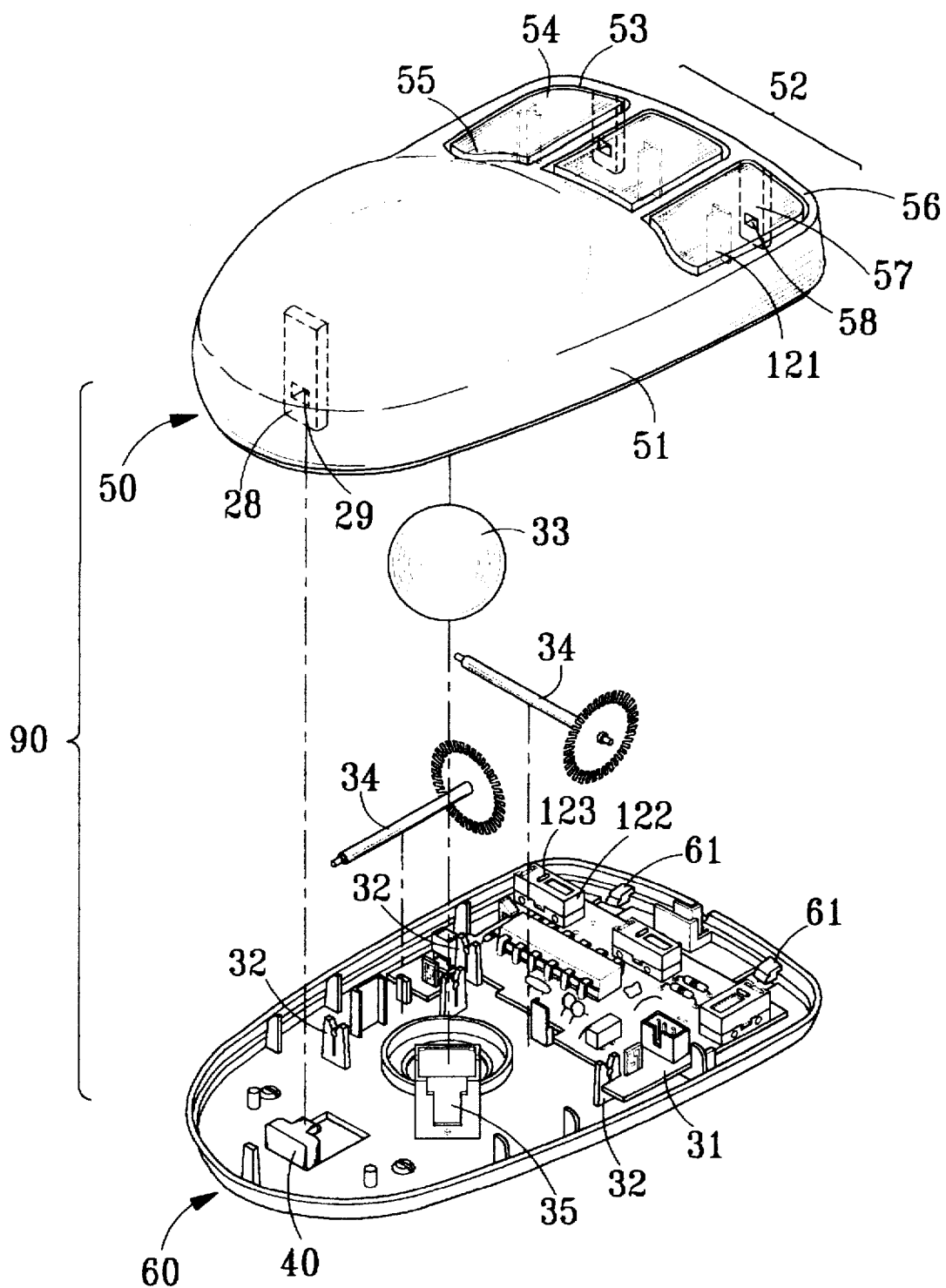
FIG. 5 is an exploded perspective view of a second embodiment made according to this invention wherein the upper cover is disassembled from the chassis.
Figure 6:
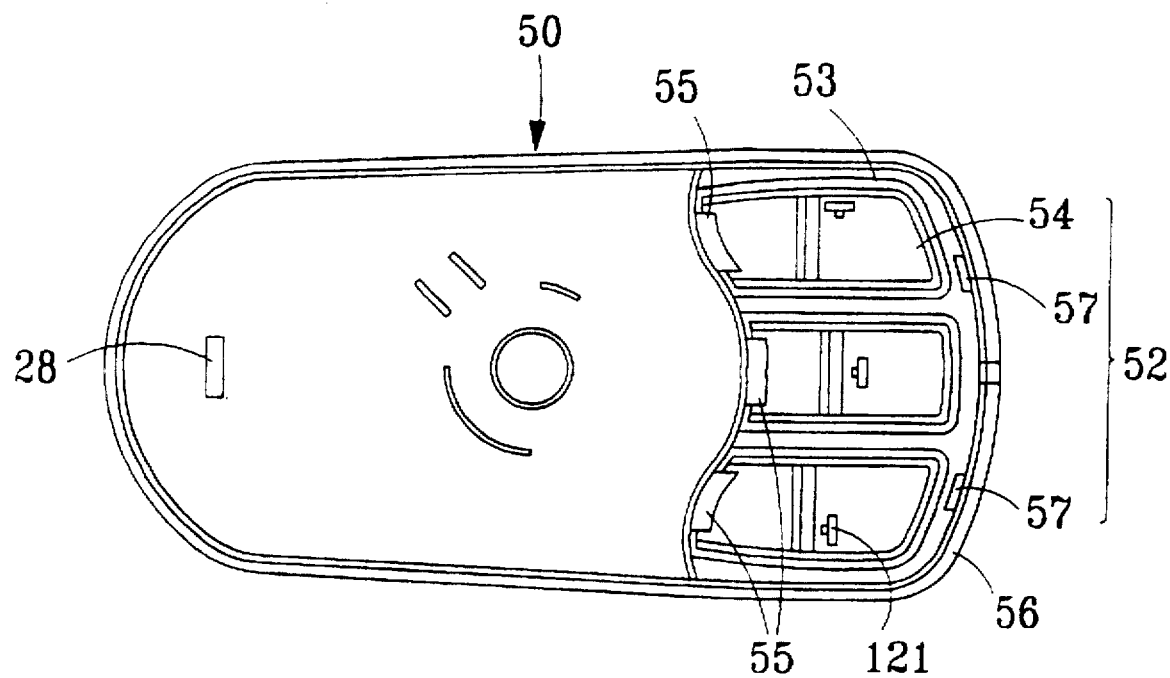
FIG. 6 is a top view of a computer mouse shown in FIG. 5.
Figure 7:
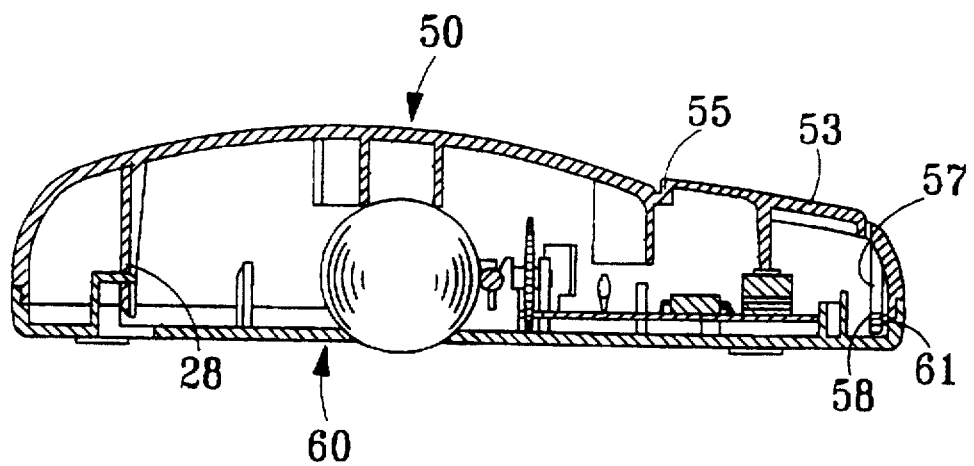
FIG. 7 is a cross sectional view of the computer mouse shown in FIG. 5.

Referring to FIGS. 5, 6 and 7, the second embodiment of the computer mouse 90 made according to this invention includes an upper cover 50 and a chassis 60.

The upper cover 50 has a dome portion and a flange portion 51 extends downward defining a space for receiving the elements. Said upper cover 50 defines a key assembly 52 at a front portion which includes two (2) or three (3) key seats 53. Each of said key seats 53 is provided with a key 54, totally, two (2) or three (3) keys 53 are provided. Each of said keys 54 is interconnected with said upper cover 50 by a connecting tab 55. Said key assembly 52 and said upper cover 50 are of a one-piece structure. The stroke of said key 54 is limited by said key seat 53. By this arrangement, the lever 123 of said micro switch 122 can be accurately triggered by the actuating post 121 disposed beneath said key 54. The front portion 56 of said upper cover 50 is provided with two retaining posts 57. A retaining hole 58 is provided at the lower end of each retaining post 57. The middle portion of the rear part of said upper cover 50 is provided with a fastener mechanism 28.

Said chassis 60 has a disk structure defining a mounting area for installing the printed circuit board 31, encoding wheel supporter 32 and tracing ball 33. The layout of said elements are similar with the prior art. The front portion of said chassis 60 is provided with a pair of clipping tabs 61 to be engaged with said retaining holes 58 of said retaining posts 57 when said upper cover 50 is attached to said chassis 60. By this arrangement, those two elements can be fastened together. Said chassis 60 is also provided with a buckle mechanism 40 engageable to said fastener mechanism 28 of said upper cover 50.

Figure 8:
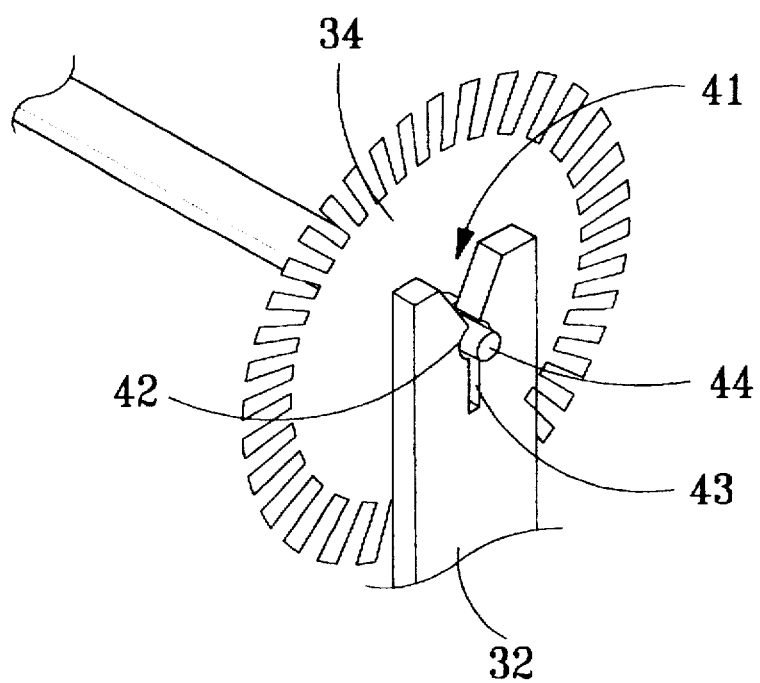
FIG. 8 is a perspective view of the encoding wheel supporter.

Referring to FIG. 8, there is shown a perspective view of the encoding wheel supporter 32 made according to this invention. The encoding wheel supporter 32 features a Y-shape slot 41 in the central portion. Said Y-shape slot 41 includes a circular holder 42 having an elastic space 43 thereunder. By this arrangement, said elastic space 43 sustains most of the strain during the assembling process. In assembling, said encoding wheel 34 is directly pressed into said Y-shape slot 41 in such a manner that both ends of the shaft of said encoding wheel 34 are positioned within said circular holder 42. Further more, the Y-shape slot 41 facilitates an easy operation of adding lubricant.

Figure 9:
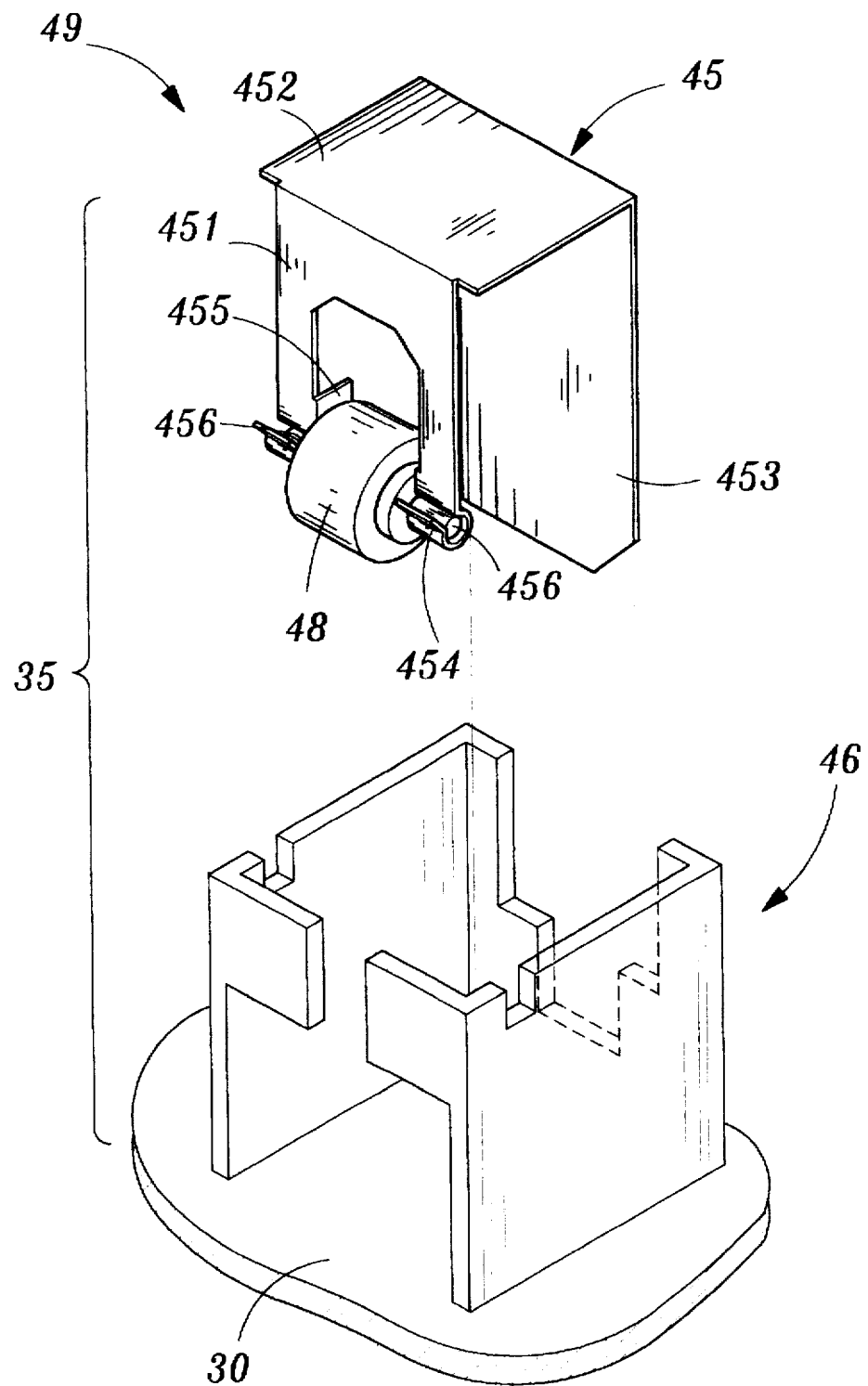
FIG. 9 is a cross sectional view showing the relationship between the roller supporter and the tracing ball.

Referring to FIGS. 9 and 9A, said roller mechanism 35 includes a roller supporter 49 and a roller bracket 46. Said roller supporter 49 is made from a U-shape elastic sheet member 45. Said roller mechanism 35 is disposed at the roller bracket 46 in such a manner that the pressing lever 47 of said upper cover 40 is engageable against the top surface of said U-shape sheet 45 in order to prevent the U-shape sheet 46 from escaping therefrom. Said U-shape sheet 45 further provides a biasing force toward said tracing ball 33. Said U-shape sheet 45 is directly pressed from an elastic plate and defines a front portion 451, an upper portion 452 and a rear portion 453. Said front portion 451 is provided with a shaft seat 454 and a roller retainer 455 for receiving a roller 48 thereof by its shaft 456. Both sides of said roller 48 will also be retained by said retainer 455. In assembling, said roller 48 can be readily mounted within said U-shaped sheet 45 by the engagement between the shaft of said roller 48 and said shaft seat 454. Then a roller supporter 49 is formed and is ready to be mounted onto said roller bracket 46 without requiring an individual spring. This will make the assembling process easy, and accordingly, cost is reduced.

Figure 10:
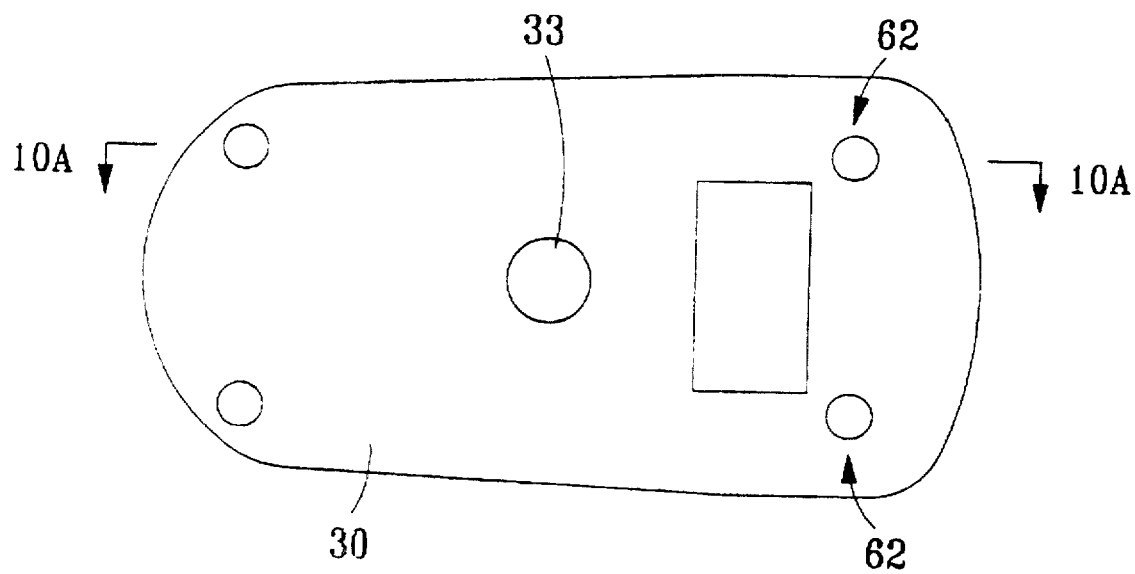
FIG. 10 is a bottom view of the chassis of the computer mouse made according to this invention.
Figure 10:
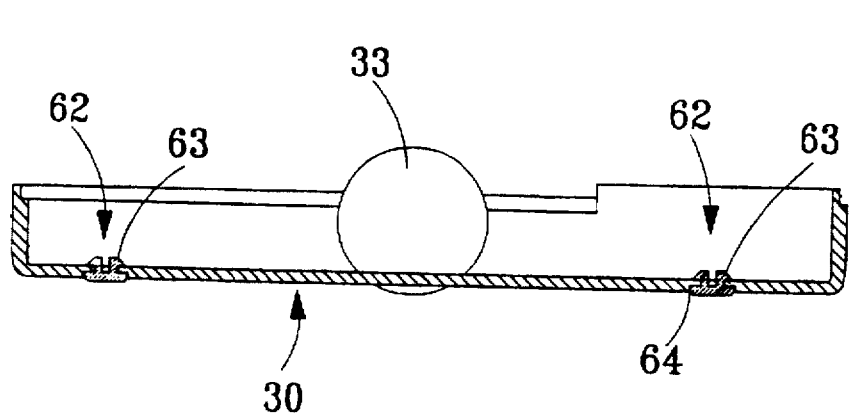
Figure 10:
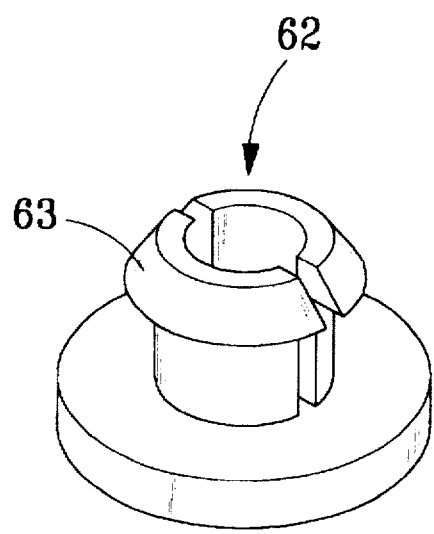

Referring to FIGS. 10, 10A and 10B, each chassis 60 of each computer mouse is provided with four (4) skidding pads 62 and each skidding pad 62 made according to this invention is provided with a ratchet hooker 63. By this arrangement, said skidding pad 62 can be readily inserted into the mounting hole 64. As a result, said skidding pad 62 is firmly attached to chassis and without the possibility of removal.

Figure 11:
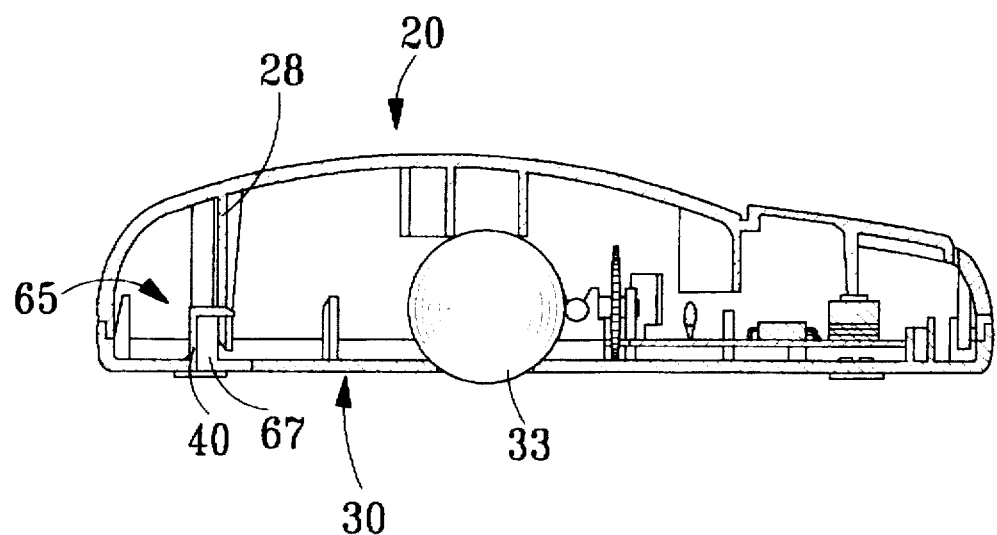
FIG. 11 is a cross sectional view of the computer mouse showing the interference fit between the upper cover and the chassis.
Figure 11A:
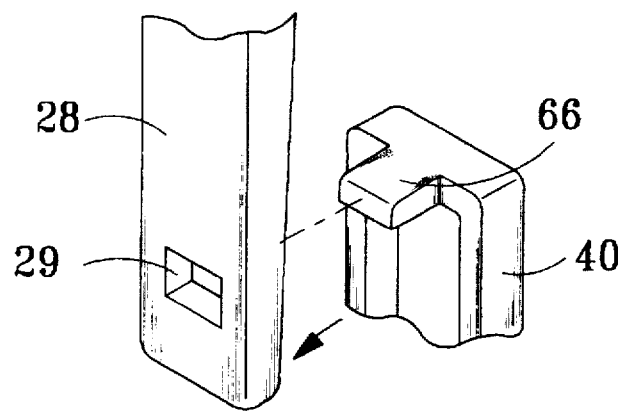
FIG. 11A is a perspective view of a computer mouse made according to this invention wherein the upper cover is disassembled from the chassis.

Referring to FIGS. 11 and 11A, said retaining mechanism 65 includes a fastener mechanism 28 disposed at the middle portion of the rear part of said upper cover 20. The lower end is provided with a retaining hole 29. Said fastener mechanism 28 is made from elastic plate. When the upper cover 20 is attached to said chassis 30, said buckle mechanism 40 of said chassis 30 is engaged with the fastener mechanism 28 of said upper cover 20 by its projection 66 and said retaining hole 29. When said upper cover 20 and said chassis 30 need to be separated, the user can insert a sharp member through the backup hole 67 to engage the lower end of said fastener mechanism 28. Accordingly, said projection 66 is released from said retaining hole 29 and said upper cover 20 is ready to separate from said chassis 30.

Figure 12:
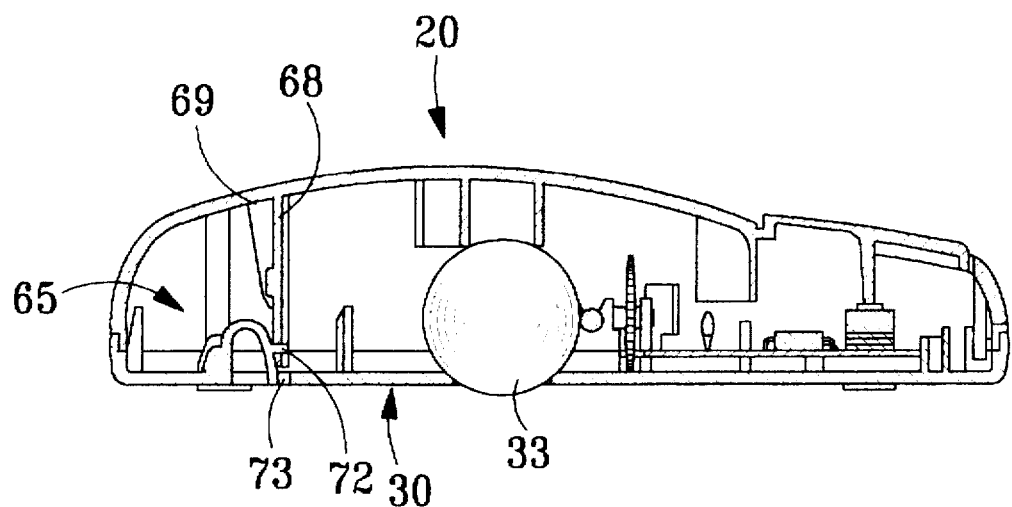
FIG. 12 is a cross sectional view similar to FIG. 11 showing another embodiment of the retaining tab and retaining hole.
Figure 12:
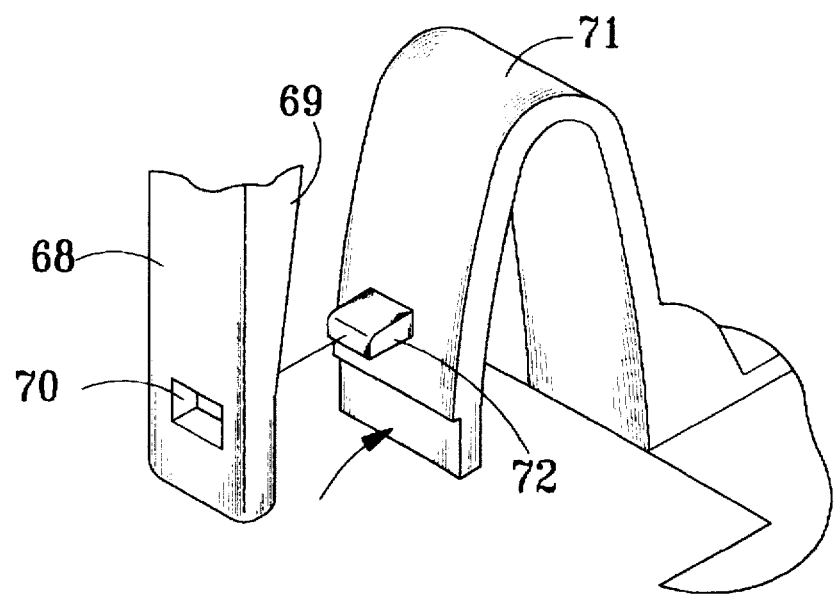

FIGS. 12 and 12A disclose another embodiment of said buckle and fastener mechanism. The fastener mechanism 68 of said upper cover 20 is strengthened with a reinforcing plate 69. Accordingly, the fastener mechanism 68 is fixed to the underside of said upper cover 20. A retaining slot 70 is provided at the lower end of said fastener mechanism 68. The buckle mechanism 71 of said chassis 30 is an arcuate plate having a projection 72 thereon. When said upper cover 20 is attached to said chassis 30, said projection 72 of said plate 71 is retained by said retaining slot 70 of said upper cover 20. When said upper cover 20 and said chassis 30 need to be separated, the user can insert a sharp member through the backup hole 73 of said chassis 30 to reach the lower end of said buckle mechanism 71. Accordingly, said projection 72 is released from said retaining slot 70 and said upper cover 20 is ready to separate from said chassis 30. Many changes and modifications in the above described embodiments of the invention can, of course, be carried out without departing from the spirit thereof. Accordingly, to promote the progress in science and the useful arts, the invention is disclosed and is intended to be limited only by the scope of the appended claims.

What is claimed is:

1. A computer mouse structure including an upper cover and a chassis, a front portion of said upper cover being defined with a key assembly including a plurality of keys, said chassis defining a mounting area for mounting a printed circuit board, an encoding wheel, a roller mechanism and a plurality of skidding pads, the improvements comprising:

each of said keys being interconnected with said upper cover by a tab, said key assembly and said upper cover being made integrally into an one-piece structure, each of said keys being provided with a retaining post, a projection being extended from the lower end of said retaining post, said upper cover being further provided with a plurality of fastening posts, each post having a retaining hole at a lower end thereof, said upper cover being further provided with a fastener mechanism having a retaining hole at a lower end thereof;

said chassis having an irregular peripheral wall defining a mounting space, an inner front of the peripheral wall being provided with a flange having a plurality of retaining holes, a middle portion of said chassis being provided with a dowel, said chassis being also provided with a buckle mechanism for engaging with the fastener mechanism of said upper cover; and said retaining holes being slidably engaged with the projections of said retaining posts when the upper cover is attached to said chassis, by this arrangement, the stroke of said keys is limited by the vertical length of said retaining holes for accurately triggering a lever of a microswitch by said actuating post.

2. A computer mouse structure including an upper cover and a chassis, a front portion of said upper cover being defined with a key assembly including a plurality of keys, said chassis defining a mounting area for mounting a printed circuit board, an encoding wheel having a shaft, a roller mechanism and a plurality of skidding pads, the improvements comprising;

said upper cover having a dome portion and a flange portion extending downward defining a space for receiving a plurality of elements, the flange portion which extends downward being provided at a periphery, said upper cover defining a key assembly at a front portion which includes a plurality of key seats, each of said key seats being disposed with a key for limiting the stroke of said key, said upper cover being further provided with a fastener mechanism and a plurality of fastening posts, each post having a retaining hole; and said chassis having a disk structure defining a mounting area for installing the elements, the front portion of said chassis being provided with a plurality of clipping tabs to be engaged with said retaining holes of said retaining posts when said upper cover is attached to said chassis, said chassis being also provided with a buckle mechanism for connecting to said fastener mechanism of said upper cover.

3. A computer mouse as recited in claim 1 or 2, further including an encoding wheel supporter having a Y-shape slot in a central portion thereof, said Y-shape slot including a circular holder having an elastic space thereunder for sustaining strain during an assembling process, said encoding wheel being directly engageable into said Y-shape slot wherein both ends of the shaft of said encoding wheel are positioned within said circular holder.

4. A computer mouse as recited in claim 1 or 2, wherein said roller mechanism is made from a U-shape elastic sheet member, said chassis includes a roller bracket, said roller mechanism is disposed at the roller bracket, a pressing lever of said upper cover being engageable against a top surface of said U-shape sheet to prevent the U-shape sheet from escaping therefrom, a tracing ball on the chassis, said U-shape sheet further provides a biasing force toward said tracing ball, said U-shape sheet defines a front portion, an upper portion and a rear portion, said front portion being provided with a shaft seat and a roller retainer for receiving a shaft of a roller.

5. A computer mouse as recited in claim 1 or 2, wherein an underside of said chassis is provided with a plurality of mounting holes for installing a plurality of skidding pads, each pad having a ratchet hooker for preventing removal of the pad.

6. A computer mouse as recited in claim 1 or 2, wherein said fastener mechanism is disposed at a middle portion of a rear part of said upper cover, a lower end of the fastener mechanism being provided with a retaining hole, said fastener mechanism being made from elastic plate, said buckle mechanism of said chassis includes a projection engageable with the retaining hole of said fastener mechanism, and the chassis including a backup hole for receiving a sharp member to disengage the projection from the retaining hole.

7. A computer mouse as recited in claim 1 or 2, wherein the fastener mechanism of said upper cover is strengthened with a reinforced plate, said fastener mechanism being fixed to an underside of said upper cover, a retaining slot being provided at a lower end of said fastener mechanism, the buckle mechanism of said chassis includes an arcuate plate having a projection thereon, when said upper cover is attached to said chassis, said projection of said arcuate plate is engaged within said retaining slot of said upper cover, and the chassis including a backup hole for receiving a sharp member to disengage the projection from the retaining slot.

* * * * *